(12) United States Patent
Yahashi

(10) Patent No.: US 12,293,384 B2
(45) Date of Patent: May 6, 2025

(54) NON-TRANSITORY COMPUTER-READABLE RECORDING MEDIUM STORING COMPUTER-READABLE INSTRUCTIONS FOR SERVER THAT PROVIDES SERVICE RELATED TO PRINTER, SERVER PROVIDING SERVICE RELATED TO PRINTER, AND METHOD EXECUTED BY SERVER THAT PROVIDES SERVICE RELATED TO PRINTER

(71) Applicant: BROTHER KOGYO KABUSHIKI KAISHA, Nagoya (JP)

(72) Inventor: Yoshifumi Yahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/496,474

(22) Filed: Oct. 27, 2023

(65) Prior Publication Data
US 2024/0152951 A1 May 9, 2024

(30) Foreign Application Priority Data
Nov. 9, 2022 (JP) .................. 2022-179831

(51) Int. Cl.
*G06Q 30/0207* (2023.01)
*H04N 1/34* (2006.01)

(52) U.S. Cl.
CPC ......... *G06Q 30/0237* (2013.01); *H04N 1/346* (2013.01)

(58) Field of Classification Search
CPC .......................... G06Q 30/0237; H04N 1/346
See application file for complete search history.

(56) References Cited

U.S. PATENT DOCUMENTS

| | | | |
|---|---|---|---|
| 9,076,083 B1* | 7/2015 | Person | G06Q 10/00 |
| 2002/0049638 A1* | 4/2002 | Ito | G06Q 30/0635 705/26.81 |
| 2005/0242178 A1* | 11/2005 | Minowa | G06Q 30/0225 235/383 |
| 2006/0039733 A1* | 2/2006 | Meyerhofer | G06F 3/121 400/62 |

(Continued)

FOREIGN PATENT DOCUMENTS

| | | |
|---|---|---|
| JP | 2002-109335 A | 4/2002 |
| JP | 2017-049767 A | 3/2017 |

*Primary Examiner* — Azam A Ansari
(74) *Attorney, Agent, or Firm* — KENEALY VAIDYA LLP

(57) ABSTRACT

A server may receive, from a terminal device, user identification information, first type of first printer identification information and a specific benefit code. In a case where the user identification information, the first type of first printer identification information and the specific benefit code are received from the terminal device and the first type of first printer identification information and a specific benefit code are stored in a memory in association with each other, the server may grant a specific benefit corresponding to the specific benefit code to a user identified by the user identification information. In a case where the first type of first printer identification information and the specific benefit code are not stored in the memory in association with each other, the specific benefit is not granted to the user.

11 Claims, 6 Drawing Sheets

(56) References Cited

U.S. PATENT DOCUMENTS

Figure 1:
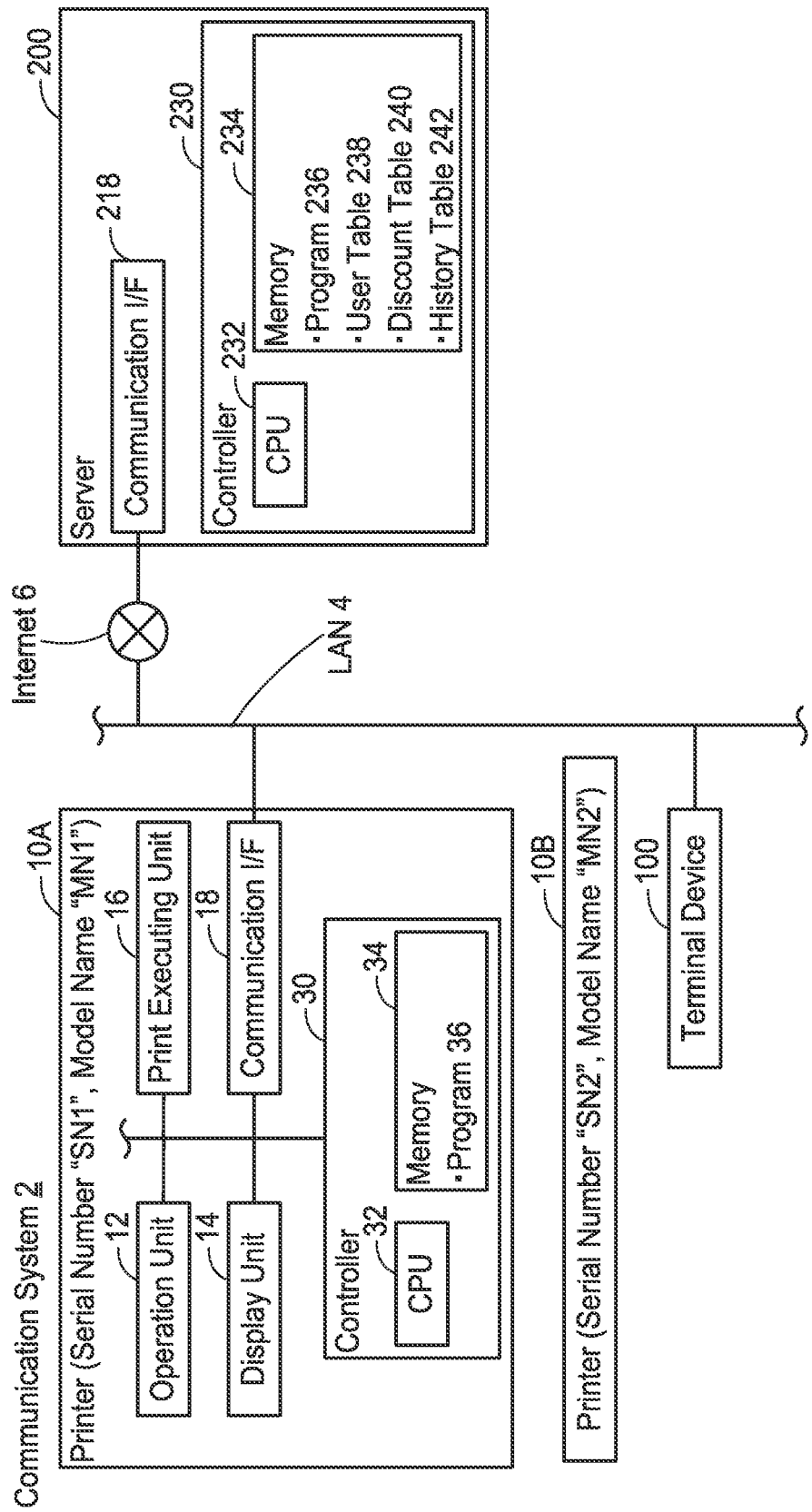

2013/0103461 A1* 4/2013 Bhatia ............... G06Q 30/0207
705/14.1
2017/0063646 A1* 3/2017 Kawai .................. G06Q 10/10

* cited by examiner

FIG. 2

User Table 238

| User Name | Password | Serial Number | Token | Address Information | Payment Information | Applicable Discount Information |
|---|---|---|---|---|---|---|
| U1 | PW1 | SN1 | tk1 | AD1 | PI1 | DI1 |
| ... | ... | ... | ... | ... | ... | ... |

Discount Table 240

| Discount Code | Discount Condition | | Discount Information |
|---|---|---|---|
| | Model Name | Country Information | Provider Information | |

| Discount Code | Model Name | Country Information | Provider Information | Discount Information |
|---|---|---|---|---|
| AAA | MN1 | JP | A Company | DI1(4 months+400 sheets/month) |
| BBB | MN1 | JP | - | DI2(4 months+200 sheets/month) |
| CCC | MN2 | US | B Company | DI3(2 months+400 sheets/month) |

History Table 242

| Serial Number | Applicable Discount Code |
|---|---|
| SN1 | AAA |
| ... | ... |

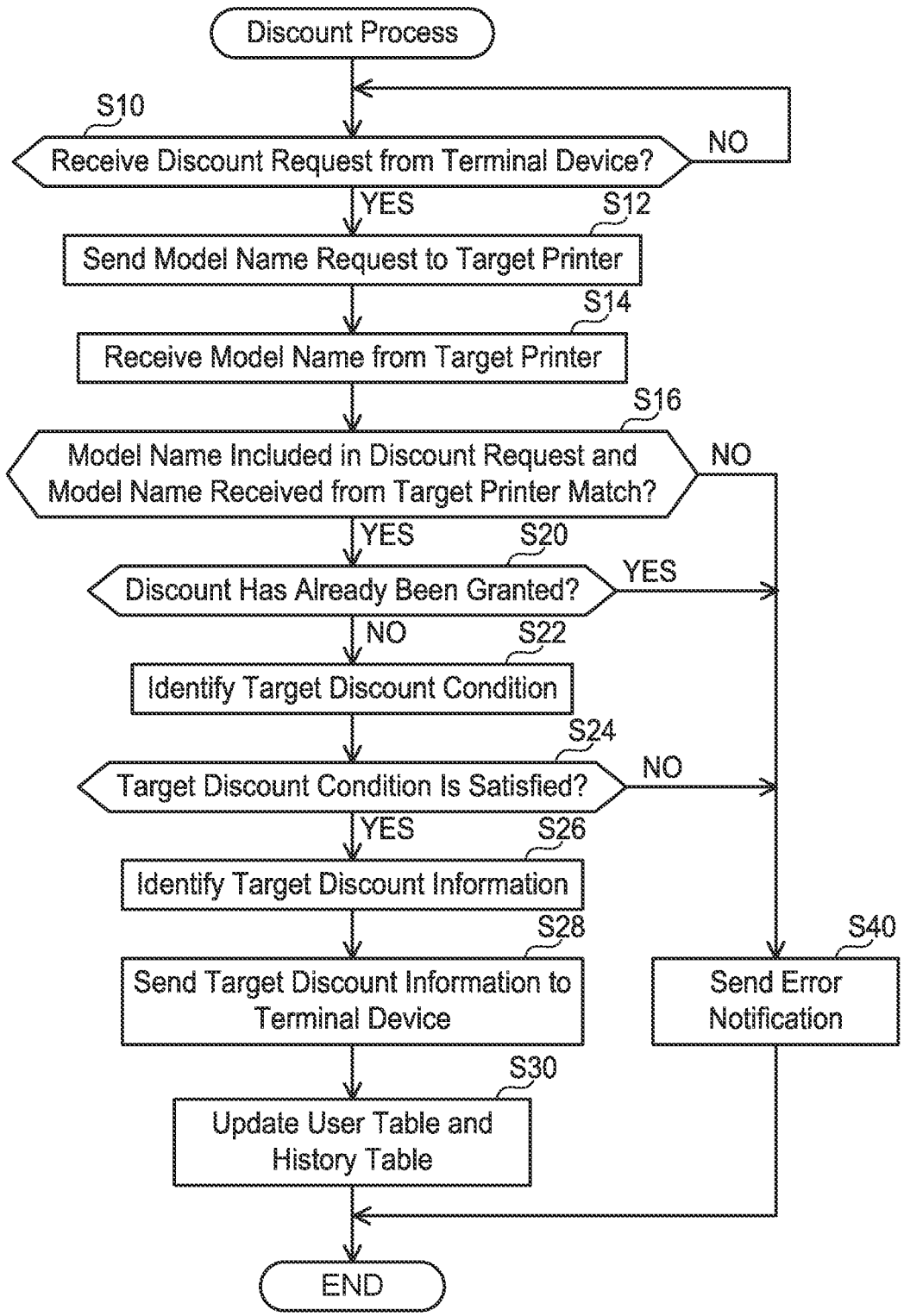

NON-TRANSITORY COMPUTER-READABLE RECORDING MEDIUM STORING COMPUTER-READABLE INSTRUCTIONS FOR SERVER THAT PROVIDES SERVICE RELATED TO PRINTER, SERVER PROVIDING SERVICE RELATED TO PRINTER, AND METHOD EXECUTED BY SERVER THAT PROVIDES SERVICE RELATED TO PRINTER

This application claims priority from Japanese Patent Application No. 2022-179831 filed on Nov. 9, 2022, the entire contents of which are incorporated herein by reference.

BACKGROUND ART

A communication system including a printer, a PC, and an information management server is known. Each time a flat-rate printing process is executed, the printer stores printing information related to the number of sheets printed and sends the printing information to the information management server. When the information management server receives the printing information from the printer, it manages the printing information. The information management server uses the printing information received from the printer to provide a service of the flat-rate printing process.

DESCRIPTION

The present disclosure provides a novel technique for granting a benefit to a user.

The present disclosure discloses a non-transitory computer-readable recording medium storing computer-readable instructions for a server that provides a service related to a printer. The server may comprise: a memory configured to store, for each of one or more benefit codes corresponding to one or more benefits of the service, the benefit code and first type of printer identification information identifying a printer in association with each other, and a processor. The computer-readable instructions, when executed by the processor, may cause the server to: receive, from a terminal device, user identification information, first type of first printer identification information and a specific benefit code; in a case where the user identification information, the first type of first printer identification information and the specific benefit code are received from the terminal device and the first type of first printer identification information and the specific benefit code are stored in the memory in association with each other, grant a specific benefit corresponding to the specific benefit code to a user identified by the user identification information, wherein in a case where the user identification information, the first type of first printer identification information and the specific benefit code are received from the terminal device and the first type of first printer identification information and the specific benefit code are not stored in the memory in association with each other, the specific benefit is not granted to the user.

According to the above configuration, the server grants the specific benefit to the user in the case where the first type of first printer identification information and the specific benefit code are stored in association with each other in the memory. On the other hand, the server does not grant the specific benefit to the user in the case where the first type of first printer identification information and the specific benefit code are not stored in association with each other in the memory. Thus, the server can switch whether to grant the specific benefit to the user or not depending on whether the first type of first printer identification information and the specific benefit code are stored in the memory in association with each other.

A computer-readable recording medium storing the above computer-readable instructions, a server realized by the above computer-readable instructions, and a method executed by the server are also novel and useful. Further, a communication system including a server, a printer, and a terminal device is also novel and useful.

Figure 4:
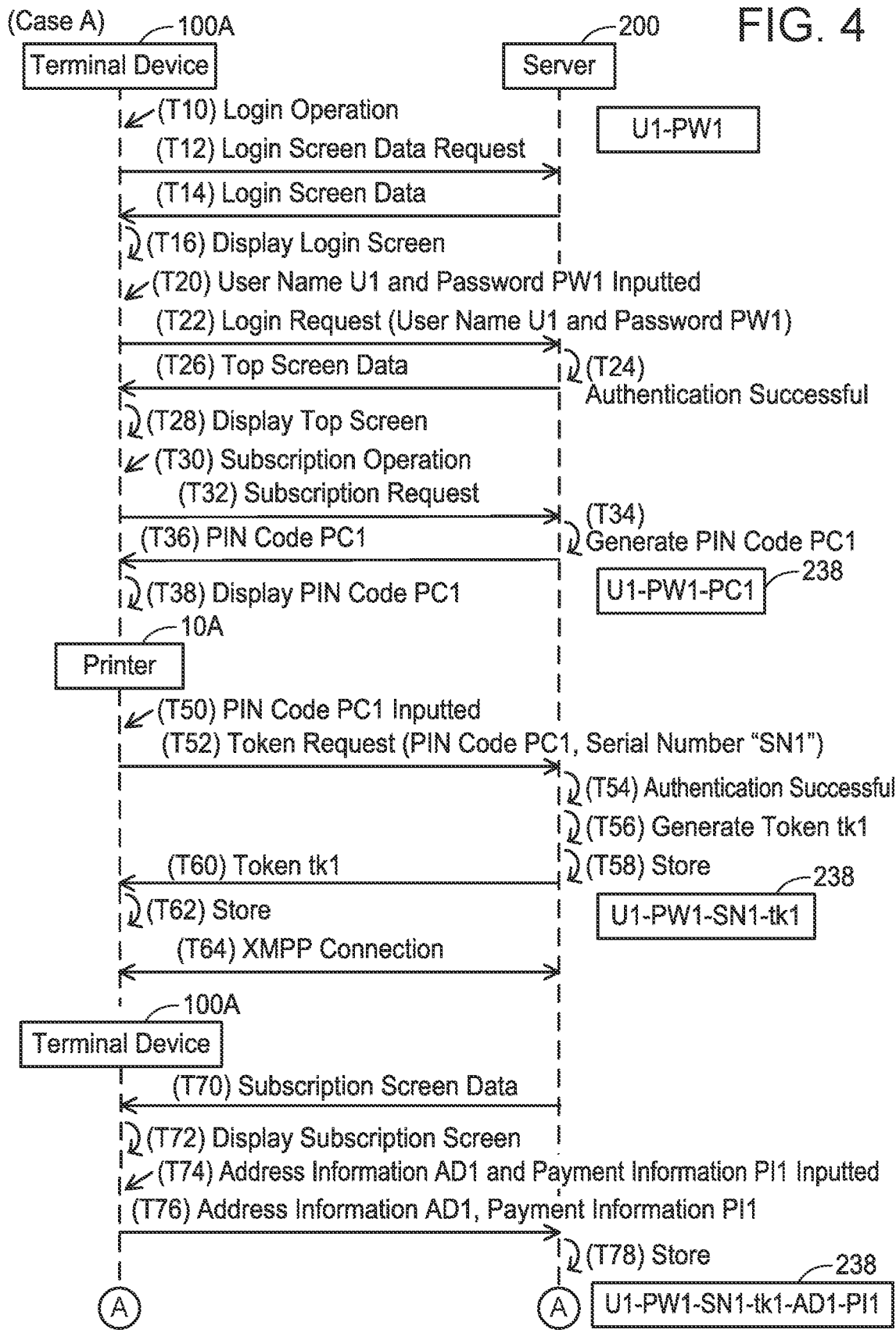
Figure 5:
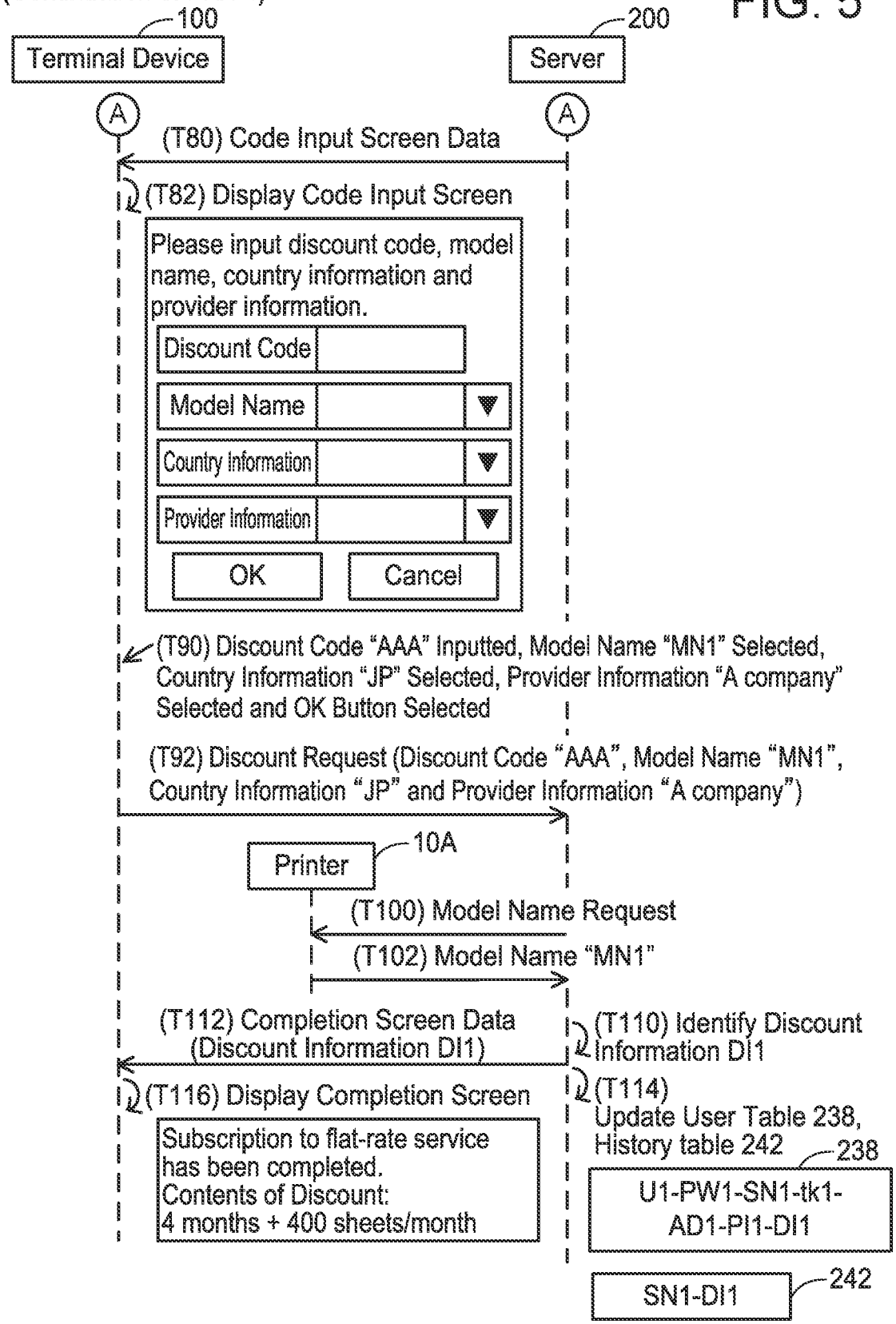
Figure 6:
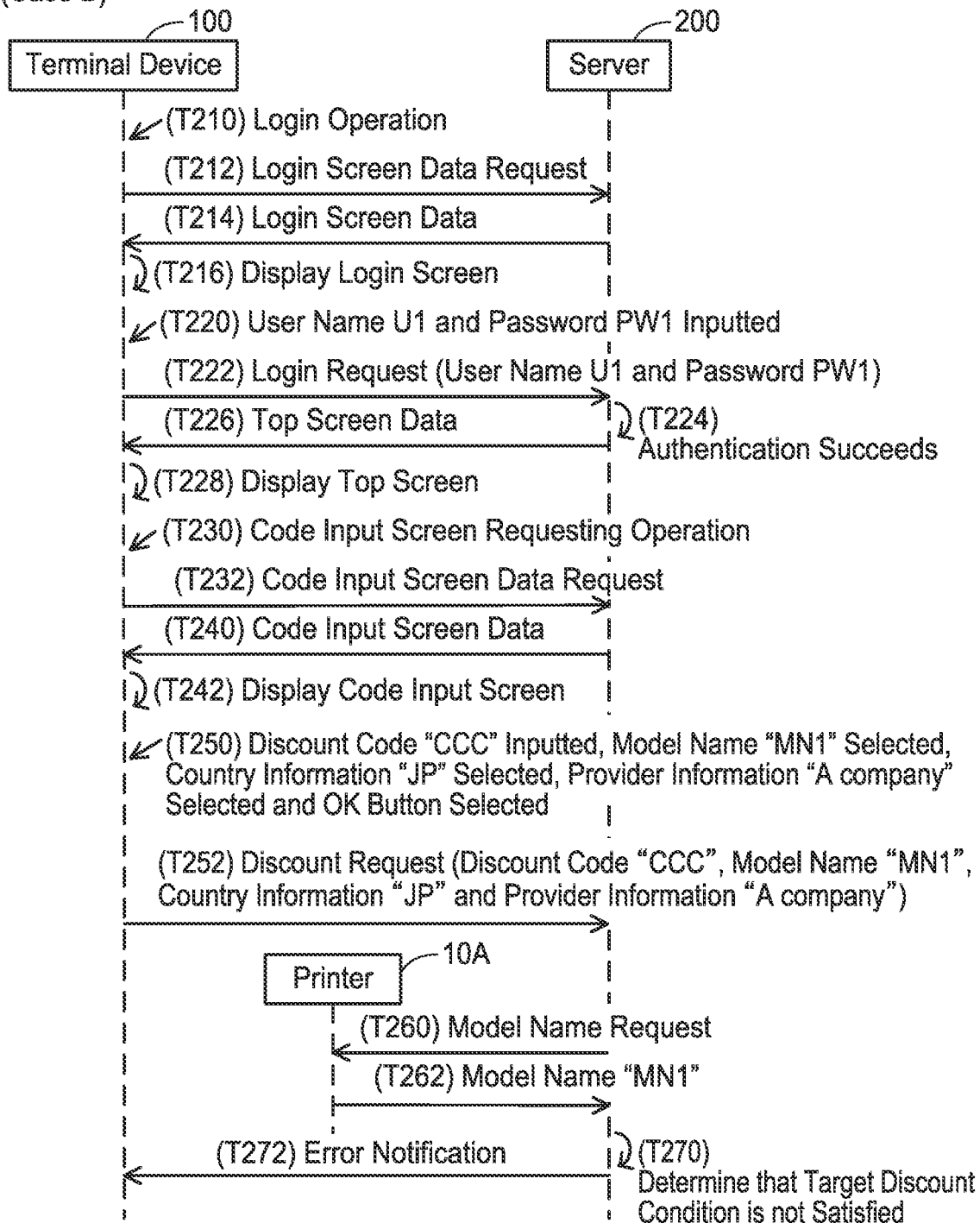

FIG. 1 illustrates a structure of a communication system.
FIG. 2 illustrates examples of tables.
FIG. 3 illustrates a flowchart of a discount process executed by a server.
FIG. 4 illustrates a sequence diagram of Case A in which a discount is granted to a user.
FIG. 5 illustrates a continuation of FIG. 4.
FIG. 6 illustrates a sequence diagram of Case B in which no discount is granted to the user.

EMBODIMENTS (Configuration of Communication System 2; FIG. 1)

As illustrated in FIG. 1, a communication system 2 includes printers 10A and 10B, a terminal device 100, and a server 200. The terminal device 100 is a portable terminal device such as a cell phone (e.g., a smart phone), a PDA, a tablet PC, or the like. The printers 10A, 10B, and the terminal device 100 are connected to a Local Area Network (LAN) 4. The printers 10A, 10B and the terminal device 100 are configured to communicate via the LAN 4. The LAN 4 is connected to the Internet 6. The printers 10A, 10B, the terminal device 100, and the server 200 are connected to the Internet 6. The printers 10A, 10B, the terminal device 100, and the server 200 are configured to communicate via the Internet 6. The server 200 provides a flat-rate charging service related to printers (hereinafter referred to as "flat-rate service"). The flat-rate service will be described in detail later.

(Configurations of Printers 10A and 10B)

The printer 10A is a peripheral device configured to execute a printing function (i.e., a peripheral device of a PC or another device). The printer 10A may be a multifunctional device configured to execute a scanning function, a facsimile function, and the like, in addition to the printing function. The printer 10A includes an operation unit 12, a display unit 14, a print executing unit 16, a communication interface 18, and a controller 30. The printer 10A has a serial number "SN1" and a model name "MN1". The serial number is an identification number assigned at the time of manufacture of a printer and is information for identifying the printer. The model name is information that indicates a model of a printer. Hereafter, the interface may be described as "I/F".

The operation unit 12 includes a plurality of keys. The user can input various instructions to the printer 10A by operating the operation unit 12. The display unit 14 is a display for displaying various information. The print executing unit 16 comprises a printing mechanism of an inkjet scheme, a laser scheme, or the like.

The communication I/F 18 is connected to the LAN 4. The communication I/F 18 may be a wireless I/F or a wired I/F.

The controller 30 includes a CPU 32 and a memory 34. The CPU 32 executes various processes according to a program 36 stored in the memory 34. The memory 34 is configured of a volatile memory, a nonvolatile memory, and the like.

The printer 10B has the same configuration as the printer 10A, except that it has a serial number "SN2" and a model name "MN2". Hereafter, the printers 10A and 10B may be referred to collectively as "printer 10".

(Configuration of Server 200)

The server 200 is installed on the Internet 6 by a vendor of the printer 10. In a modification, the server 200 may be installed on the Internet 6 by a provider different from the vendor. In another modification, the vendor of the printer 10 may not prepare hardware of the server 200 by itself, but may use an environment provided by an external cloud computing service. In this case, the vendor of the printer 10 may prepare a program (i.e., software) for the server 200 and implement the server 200 by installing it in the environment described above. As described above, the server 200 provides the flat-rate service. The flat-rate service is a charging service to charge a predetermined amount of fee (hereinafter referred to as the "flat-rate fee") when the number of printed sheets printed by the printer 10 in a predetermined period is equal to or less than a contractual number of printed sheets (e.g., 1000 sheets), and when the number of printed sheets printed by the printer 10 in the predetermined period exceeds the contractual number of sheets, the charging service charges a sum of the flat-rate fee and a fee corresponding to the number of sheets exceeding the contractual number of sheets (hereinafter the fee may be referred to as "additional fee"). The flat-rate service includes an automatic ordering service. The automatic ordering service is a service to automatically order a new dedicated cartridge when an amount of ink remaining in the dedicated cartridge attached to the print executing unit 16 of the printer 10 falls to or below a predetermined amount. The dedicated cartridge is a cartridge that is shipped from the server 200 and can be used only when the printer is receiving the flat-rate service. In a modification, the server 200 may provide a pay-as-you-print charging service to charge a fee based on the number of printed sheets printed by the printer 10 in a predetermined period (e.g., one month) instead of the flat-rate service.

The server 200 includes a communication OF 218 and a controller 230. The communication OF 218 is connected to the Internet 6. The controller 230 includes a CPU 232 and a memory 234. The CPU 232 executes various processes according to a program 236 stored in the memory 234. The memory 234 is configured of a volatile memory, a nonvolatile memory, and the like. The memory 234 further stores a user table 238, a discount table 240, and a history table 242.

(Configurations of Tables; FIG. 2)

Next, referring to FIG. 2, contents of the user table 238, the discount table 240, and the history table 242 in the server 200 are described.

The user table 238 is a table for managing information about a user. In the user table 238, a user name (e.g., U1) to identify the user, a password (e.g., PW1), a serial number (e.g., SN1), a token (e.g., tk1), address information (e.g., AD1) indicating an address of the user, payment information (e.g., UPI1), and applicable discount information indicating a discount granted to the user are stored in association with each other. The token is authentication information for establishing an eXtensible Messaging and Presence Protocol (XMPP) connection between the printer 10 and the server 200. The payment information is information about the source of the fee payment (e.g., credit card number). The applicable discount information is information corresponding to discount information in the discount table 240 described below.

The discount table 240 is a table for identifying contents of a discount to be granted to a user. In the discount table 240, a discount code (e.g., AAA, BBB, CCC), discount condition, and discount information (e.g., DI1 to DI3) are stored in association with each other. The discount code is a coupon code distributed to the user. The discount code is distributed to the user by the server 200. The discount condition is information for limiting a target to which the discount information associated with the conditions is given. The discount condition includes a model name (e.g., MN1, MN2), country information (e.g., JP, US), and provider information (e.g., Company A, Company B). The country information indicates a country in which the printer 10 is installed. The provider information indicates a name of a provider from which the user purchased the printer 10. That is, the provider information indicates a name of a provider that sells the printer 10. The discount condition always includes the model name, but may not include at least one of the country information and the provider information. The discount information DI1 to DI3 indicates a discount to be granted to the user. The discount information DI1 to DI3 includes discount period information (e.g., 4 months, 2 months) and discounted number of sheets information (e.g., 400 sheets/month, 200 sheets/month). The discount period information indicates a free period during which the flat-rate fee is not charged. The discounted number of sheets information indicates the number of sheets that can be printed for free during the free period when the contractual number of printed sheets is exceeded.

The history table 242 is a table for managing the history of discount(s) granted to a user. In the history table 242, a serial number and an applicable discount code are stored in association with each other.

(Discount Process; FIG. 3)

Referring to FIG. 3, a discount process executed by the CPU 232 of the server 200 is described. The CPU 232 starts the process in FIG. 3 when log-in using the terminal device is completed. The communication below is executed via the communication I/Fs 18 and 218. Therefore, an explanation "via the communication I/Fs 18 and 218" is omitted in the following description.

In S10, the CPU 232 monitors receipt of a discount request from the terminal device 100. The discount request is a signal requesting to grant a discount to the user of the terminal device 100. The discount request includes the discount code and the model name. The discount request may also include the country information and the provider information.

In S12, the CPU 232 identifies in the user table 238 the serial number associated with the user name of the user logging in to the server 200 (hereinafter referred to as "target serial number"). The CPU 232 sends a model name request to the printer having the target serial number (hereinafter referred to as "target printer"). The model name request is a signal requesting to send the model name of the printer.

In S14, the CPU 232 receives from the target printer the model name of the printer.

In S16, the CPU 232 determines whether the model name included in the received discount request (see S10) and the model name received from the target printer (see S14) match. When the model name included in the received discount request and the model name received from the target printer match (YES in S16), the CPU 232 proceeds to S20, while when the model name included in the received discount request and the model name received from the target printer do not match (NO in S16), the CPU 232 proceeds to S40.

In S20, the CPU 232 determines whether the discount corresponding to the discount code in the received discount request has already been granted to the user. When the combination of the target serial number and the discount code in the discount request is not stored in the history table 242, the CPU 232 determines NO in S20 and proceed to S22. On the other hand, when the combination of the target serial number and the discount code in the discount request is stored in the history table 242, the CPU 232 determines YES in S20 and proceeds to S40.

In S22, the CPU 232 identifies, in the discount table 240, the discount condition associated with the discount code included in the received discount request as a target discount condition.

In S24, the CPU 232 determines whether the target discount condition is satisfied. The CPU 232 identifies one or more pieces of information included in the target discount condition, and determines that the target discount condition is satisfied when the received discount request includes the identified one or more pieces of information. On the other hand, the CPU 232 determines that the target discount condition is not satisfied when the received discount request does not include at least one of the identified one or more pieces of information. For example, when the target discount condition includes a model name, country information, and provider information, the CPU 232 determines that the target discount condition is satisfied when the received discount request includes the model name, country information, and provider information in the target discount condition. On the other hand, when the received discount request does not include at least one of the model name, country information, and provider information in the target discount condition, the CPU 232 determines that the target discount condition is not satisfied. Further, for example, when the target discount condition includes the model name and country information but does not include the provider information, the CPU 232 determines that the target discount condition is satisfied when the received discount request includes the model name and country information in the target discount condition. On the other hand, when the received discount request does not include at least one of the model name and country information in the target discount condition, the CPU 232 determines that the target discount condition is not satisfied. When the target discount condition is satisfied (YES in S24), the CPU 232 proceeds to S26, while when the target discount condition is not satisfied (NO in S24), the CPU 232 proceeds to S40.

In S26, the CPU 232 identifies, in the discount table 240, the discount information associated with the target discount condition as target discount information.

In S28, the CPU 232 sends the target discount information to the terminal device.

In S30, the CPU 232 updates the user table 238 and the history table 242. The CPU 232 stores the target discount information in the user table 238 in association with the user name of the user logging in to the server 200. By the target discount information being stored in the user table 238, the discount corresponding to the target discount information is granted to the user. The CPU 232 then stores the target serial number and the discount code in the received discount request in the history table 242 in association with each other. When S30 ends, the CPU 232 ends the process of FIG. 3.

As described above, the CPU 232 grants the discount to the user when the model name in the received discount request and the model name received from the target printer match (YES in S16). The target discount information is stored in the user table 238. According to this configuration, it is possible to suppress the discount from being granted to a user different from the user to whom the discount is to be granted due to the user having inputted an incorrect model name.

When the target discount condition includes the model name and country information, the CPU 232 grants the discount to the user when the received discount request includes the model name and country information in the target discount condition (YES in S24). According to this configuration, as compared to a configuration in which the target discount condition includes only the model name, a user to whom the discount is to be granted can be limited.

When the target discount condition includes the model name and the provider information, the CPU 232 grants the discount to the user when the received discount request includes the model name and the provider information in the target discount condition (YES in S24). According to this configuration, as compared to a configuration in which the target discount condition includes only the model name, a user to whom the discount is to be granted can be limited.

In S40, the CPU 232 sends an error notification to the terminal device. When NO is determined in S16, the error notification includes information indicating that the model name included in the discount request is incorrect. When NO is determined in S20, the error notification includes information indicating that the discount has already been granted. When NO is determined in S24, the error notification includes information indicating that the user is not a target to whom the discount is to be granted.

(Specific Cases; FIG. 4 to FIG. 6)

Next, specific Cases A and B realized by the communication system 2 of the present embodiment are described with reference to FIG. 4 to FIG. 6.

(Case A; FIG. 4 and FIG. 5)

Referring to FIG. 4 and FIG. 5, Case A in which a discount is granted to a user is described. In the initial state of Case A, a user name U1 and a password PW1 are stored in the user table 238 of the server 200 in association with each other. Discount information DI1 to DI3 are stored in the discount table 240 of the server 200 (see FIG. 2). The history table 242 of the server 200 is empty.

When the terminal device 100 receives a login operation in T10, it sends a login screen data request to the server 200 in T12, receives login screen data from the server 200 in T14, and displays a login screen in T16. When the terminal device 100 accepts input of the user name U1 and password PW1 in T20, it sends a login request including the user name U1 and password PW1 to the server 200 in T22.

When the server 200 receives the login request from the terminal device 100 in T22, the server 200 determines in T24 that the authentication has succeeded because the combination of the user name U1 and the password PW1 in the login request is stored in user table 238, and in T26, it sends top screen data to the terminal device 100.

When the terminal device 100 receives the top screen data from the server 200 in T26, it displays a top screen corresponding to the top screen data in T28. The top screen is a screen for subscribing to the flat-rate service and also for requesting a code input screen (see FIG. 5) for inputting a discount code. When the terminal device 100 accepts a subscription operation to subscribe to the flat-rate service in T30, the terminal device 100 sends a subscription request to the server 200 in T32. The subscription request is a signal requesting to subscribe to the flat-rate service.

When the server 200 receives the subscription request from the terminal device 100 in T32, the server 200 generates a PIN code PC1 in T34 and temporarily stores the PIN code PC1 in the user table 238 in association with the user name U1. Next, in T36, the server 200 sends the PIN code PC1 to the terminal device 100.

When the terminal device 100 receives the PIN code PC1 from the server 200 in T36, the terminal device 100 displays the PIN code PC1 in T38. Consequently, the user of the terminal device 100 can know the PIN code PC1 to be inputted to the printer 10A.

When the printer 10A accepts input of the PIN code PC1 in T50, the printer 10A sends a token request including the PIN code PC1 and the serial number "SN1" of the printer 10A to the server 200 in T52.

When the server 200 receives the token request from the printer 10A in T52, the server 200 determines in T54 that the authentication has succeeded because the PIN code PC1 stored in T34 and the PIN code PC1 in the token request match. Next, in T56, the server 200 generates a token tk1/, and in T58, the server 200 stores the received serial number "SN1" and the generated token tk1/ in the user table 238 in association with the user name U1. The server 200 also deletes the PIN code PC1 in the user table 238. Next, the server 200 sends the token tk1/ to the printer 10A in T60.

When the printer 10A receives the token tk1/ from the server 200 in T60, the printer 10A stores the received token tk1/ in the memory 34 in T62. Next, in T64, the printer 10A uses the token tk1/ to establish an XMPP connection with the server 200. The XMPP connection is a so-called a constant connection, which remains established until the printer 10A is turned off. By using the XMPP connection, the server 200 can send a request to the printer 10A across the firewall of the LAN 4 to which the printer 10A belongs, without receiving a request from the printer 10A. A mechanism for sending a request from the server 200 to the printer 10A may use another method instead of the XMPP connection. For example, a Hypertext Transfer Protocol Secure (HTTPS) connection may be established between the printer 10A and the server 200.

When the server 200 establishes an XMPP connection with the printer 10A in T64, the server 200 sends subscription screen data to the terminal device 100 in T70.

When the terminal device 100 receives the subscription screen data from the server 200 in T70, the terminal device 100 displays a subscription screen corresponding to the subscription screen data in T72. The subscription screen is a screen for inputting the address information and the payment information. When the terminal device 100 accepts input of the address information AD1 and the payment information PI1 in T74, the terminal device 100 sends the address information AD1 and the payment information PI1 to the server 200 in T76.

When the server 200 receives the address information AD1 and the payment information PI1 from the terminal device 100 in T76, the server 200 stores the address information AD1 and the payment information PI1 in the user table 238 in association with the user name U1 in T78. Next, the server 200 sends code input screen data to the terminal device 100 in T80 in FIG. 5.

When the terminal device 100 receives the code input screen data from the server 200 in T80, the terminal device 100 displays a code input screen corresponding to the code input screen data in T82. The code input screen includes a message prompting the user to input a discount code and the like, a discount code input field, a model name selection field, a country information selection field, a provider information selection field, an OK button, and a cancel button. When the terminal device 100 accepts the input of the discount code "AAA", the selection of the model name "MN1", the selection of the country information "JP", the selection of the provider information "Company A", and the selection of the OK button in T90, the terminal device 100 sends to the server 200 a discount request including the discount code "AAA", the model name "MN1", the country information "JP" and the provider information "Company A" in T92.

When the server 200 receives the discount request from the terminal device 100 in T92 (YES in S10 in FIG. 3), the server 200 identifies the serial number "SN1" associated with user name U1 in the user table 238. The server 200 sends a model name request to the printer 10A having the serial number "SN1" in T100 (S12) and receives the model name "MN1" from the printer 10A in T102 (S14). The server 200 determines that the model name "MN1" in the received discount request matches the model name "MN1" received from the printer 10A (YES in S16) and that the combination of the serial number "SN1" and the discount code "AAA" in the discount request is not stored in the history table 242 (NO in S20). The server 200 identifies in the discount table 240 the discount condition (model name "MN1", country information "JP", and provider information "Company A") associated with the discount code "AAA" in the discount request as the target discount condition (S22). The server 200 determines that the target discount condition is satisfied because the received discount request includes the model name "MN1", the country information "JP", and the provider information "Company A" (YES in S24). In this case, the server 200 identifies the discount information DI1 associated with the discount code "AAA" in the discount table 240 as the target discount information in T110 (S26) and sends a completion screen data including the discount information DI1 to the terminal device 100 in T112 (S28). In T114, the server 200 stores the discount information DI1 in the user table 238 in association with the user name U1 and stores the serial number "SN1" and the discount code "AAA" in the history table 242 in association with each other (S30).

When the terminal device 100 receives the completion screen data from the server 200 in T112, the terminal device 100 displays a completion screen corresponding to the completion screen data in T116. The completion screen includes a message indicating that subscription to the flat-rate service is complete and the details of the discount to be granted to the user. Consequently, the user can see the details of the discount to be granted to the user.

(Case B; FIG. 6)

Referring to FIG. 6, Case B in which no discount is granted to the user is described. The initial state of Case B is the state after Case A.

T210 to T228 are the same as T10 to T28 in FIG. 4. In T230, the terminal device 100 accepts an operation requesting a code input screen to input a discount code, and the terminal device 100 sends a code input screen request to the server 200 in T232. The terminal device 100 receives the code input screen data from the server 200 in T240, and displays the code input screen (see FIG. 5) corresponding to the code input screen data in T242. In the present case, in T250, the terminal device 100 accepts input of the discount code "CCC", selection of the model name "MN1", selection of the country information "JP", selection of the provider information "Company A", and selection of the OK button. In this case, the terminal device 100 sends a discount request including the discount code "CCC", the model name "MN1", the country information "JP", and the provider information "Company A" to the server 200 in T252.

T260 and T262 are the same as T100 and T102 in FIG. 5, respectively. The server 200 determines that the model name "MN1" included in the received discount request matches the model name "MN1" received from the printer 10A (YES in S16) and that the combination of the serial number "SN1" and the discount code "CCC" in the discount request is not stored in the history table 242 (NO in S20). Next, the server 200 identifies, in the discount table 240, the discount condition associated with the discount code "CCC" (the model name "MN2", country information "US", and provider information "Company B") as the target discount condition (S22). Next, in T270, the server 200 determines that the target discount condition is not satisfied (NO in S24) because the received discount request does not include any of the model name "MN2", country information "US", and provider information "Company B". In this case, the server 200 does not store the discount information in the user table 238, but in T272, it sends to the terminal device 100 an error notification including information indicating that the printer is not a printer to which the discount is to be granted.

(Effect of Present Embodiment)

As shown in Case A in FIG. 4 and FIG. 5, when the user name U1, the model name "MN1" and the discount code "AAA" are received from the terminal device 100 (T22 in FIGS. 4 and T92 in FIG. 5) and the model name "MN1" and the discount code "AAA" are stored in association with each other in the memory 234, the server 200 grants the discount indicated by the discount information DI1 to the user (T114 in FIG. 5). On the other hand, as shown in Case B of FIG. 6, when the user name U1, the model name "MN1" and the discount code "CCC" are received from the terminal device 100 (T222, T252 in FIG. 6), and the model name "MN1" and the discount code "CCC" are not stored in the memory 234 in association with each other, the server 200 does not grant the discount to the user. Thus, the server 200 can switch whether to grant the discount to the user depending on whether a specific model name and a specific discount code are stored in association with each other in the memory 234.

(Corresponding Relationships)

The flat-rate service is an example of a "service related to a printer". A discount code is an example of "benefit code". The model name is an example of "first type of printer identification information". The user name U1 is an example of "user identification information". The model name "MN1" in the discount request of T92 in FIG. 5 and the model name "MN1" in the discount request of T252 in FIG. 6 are examples of "first type of first printer identification information". The discount code "AAA" in the discount information of T92 in FIG. 5 and the discount code "CCC" in the discount request of T252 in FIG. 6 are examples of "specific benefit code". The serial number "SN1" is an example of the "second type of printer identification information". The printer 10A is an example of "specific printer". The model name request is an example of "sending request". The model name "MN1" of T102 in FIG. 5 is an example of "first type of second printer identification information". The country information is an example of "area information". The country information "JP" in the discount information of T92 in FIG. 5 and the country information "JP" in the discount request of T252 in FIG. 6 are examples of "specific area information". The provider information "Company A" in the discount information of T92 in FIG. 5 and the provider information "Company A" in the discount request of T252 in FIG. 6 are examples of "specific provider information".

S10 in FIG. 3 is an example of the process "receive, from a terminal device, user identification information, first type of first printer identification information and a specific benefit code". S30 in FIG. 3 is an example of the process "grant a specific benefit corresponding to the specific benefit code to a user".

(First Modification) The server 200 may be configured of a single server or may include a plurality of servers. For example, the server 200 may include a first server and a second server. In this modification, the first server is a server that grants a discount to a user and stores the user table 238 and the history table 242. The second server is a server that distributes the discount code to the user and stores the discount table 240. The first server executes the processes of S10 to S16 and S20 in FIG. 3 and sends the discount code received from the terminal device to the second server. When the second server receives the discount code from the first server, the second server identifies in the discount table 240 the discount condition associated with the discount code included in the received discount request as the target discount condition (S22 in FIG. 3), identifies the discount information associated with the discount code, and sends the target discount condition and the discount information to the first server. The first server uses the target discount condition and the discount information received from the second server to execute the processes from S24 to S30 in FIG. 3.

(Second Modification) S12 to S16 in FIG. 3 can be omitted. In the present modification, "send a sending request to the specific printer identified by the second type of printer identification information" and "receive first type of second printer identification information from the specific printer" may be omitted.

(Third Modification) The discount conditions may not include one of the country information and the provider information, or may include neither the country information nor the provider information.

(Fourth Modification) The "area information" is not limited to the country information, but may be information that indicates a wider area than the country information, or information that indicates a smaller area than the country information (such as a city).

(Fifth Modification) The "first type of printer identification information" is not limited to the model name, but may be a serial number or the like.

(Sixth Modification) The "specific benefit" is not limited to a discount, but may be granting points to the user.

(Seventh Modification) In the above embodiments, the processes of FIGS. 3 to 6 are implemented by a software (e.g., the programs 36, 236), however, at least one of these processes may be implemented by hardware such as a logic circuit.

What is claimed is:

1. A non-transitory computer-readable recording medium storing computer-readable instructions for a server that provides a service related to a printer, the server comprising:
    a memory configured to store, for each of one or more benefit codes corresponding to one or more benefits of the service, the benefit code and first type of printer identification information identifying a printer in association with each other, and
    a processor,
wherein the computer-readable instructions, when executed by the processor, cause the server to:
receive, from a terminal device, user identification information, first type of first printer identification information and a specific benefit code;
in a case where the user identification information, the first type of first printer identification information and the specific benefit code are received from the terminal device and the first type of first printer identification information and the specific benefit code are stored in the memory in association with each other, grant a specific benefit corresponding to the specific benefit code to a user identified by the user identification information, the grant of the specific benefit being performed in conjunction with the computer-readable instructions further causing the server to:

generate a token, in response to a token request from the terminal device;

output the token to the terminal device; and establish a constant connection between the terminal device and the server based on the token, and the constant connection allowing communication between the terminal device and the server, such that the server can send a communication to the terminal device over a firewall without receiving a request from the terminal device;

wherein in a case where the user identification information, the first type of first printer identification information and the specific benefit code are received from the terminal device and the first type of first printer identification information and the specific benefit code are not stored in the memory in association with each other, the specific benefit is not granted to the user; and the specific benefit causing printing, of the printer, to incur a fee and/or discount, in conjunction with such printing.

2. The non-transitory computer-readable recording medium as in claim 1, wherein the memory is configured to store the user identification information and second type of printer identification information identifying a specific printer in association with each other, in response to the first type of first printer identification information being inputted to the terminal device by the user, the first type of first printer identification information is received from the terminal device, and the computer-readable instructions, when executed by the processor, further cause the server to:

in a case where the user identification information, the first type of first printer identification information and the specific benefit code are received from the terminal device, send a sending request to the specific printer identified by the second type of printer identification information, the second type of printer identification information being stored in the memory in association with the user identification information, the sending request being for requesting to send first type of printer identification information; and in a case where the sending request is sent to the specific printer, receive first type of second printer identification information from the specific printer, wherein in a case where the first type of first printer identification information received from the terminal device and the first type of second printer identification information received from the specific printer match and the first type of first printer identification information and the specific benefit code are stored in the memory in association with each other, the specific benefit is granted to the user.

3. The non-transitory computer-readable recording medium as in claim 1, wherein the memory is further configured to store, for each of the one or more benefit codes, the benefit code and area information in association with each other, wherein specific area information indicating an area in which a specific printer is positioned is further received from the terminal device, and in a case where the first type of first printer identification information and the specific benefit code are stored in the memory in association with each other and the specific area information and the specific benefit code are stored in the memory in association with each other, the specific benefit is granted to the user.

4. The non-transitory computer-readable recording medium as in claim 1, wherein the memory is further configured to store, for each of the one or more benefit codes, the benefit code and provider information indicating a provider from which a printer was purchased in association with each other, wherein specific provider information indicating a provider from which a specific printer was purchased is further received from the terminal device, and in a case where the first type of first printer identification information and the specific benefit code are stored in the memory in association with each other and the specific provider information and the specific benefit code are stored in the memory in association with each other, the specific benefit is granted to the user.

5. The non-transitory computer-readable recording medium as in claim 1, wherein the first type of first identification information is a model name of a printer.

6. The non-transitory computer-readable recording medium as in claim 1, wherein the service is a charging service of charging a fee depending on a number of printed sheets printed by a printer, and each of the one or more benefits is a benefit related to a discount on a fee charged on the user.

7. The non-transitory computer-readable recording medium as in claim 1, the server being configured to:

receive a subscription request requesting to subscribe to the service from the terminal device.

8. The non-transitory computer-readable recording medium as in claim 1, in the case where the user identification information, the first type of first printer identification information and the specific benefit code are received from the terminal device and the first type of first printer identification information and the specific benefit code are stored in the memory in association with each other, store target discount information in the memory in association with the user identification information, wherein the target discount information stored in the memory is associated with the specific benefit code.

9. The non-transitory computer-readable recording medium as in claim 1, the computer-readable instructions, when executed by the processor, further cause the server to:

in a case where the user identification information, the first type of first printer identification information and the specific benefit code are received from the terminal device and the first type of first printer identification information and the specific benefit code are stored in the memory in association with each other, send, to the terminal device, target discount information stored in the memory in association with the specific benefit code, wherein the terminal device, in a case where the target discount information is received from the server, displays the target discount information.

10. A server providing a service related to a printer, the server comprising:

a memory configured to store, for each of one or more benefit codes corresponding to one or more benefits of the service, the benefit code and first type of printer identification information identifying a printer in association with each other, and a controller configured to:
  receive, from a terminal device, user identification information, first type of first printer identification information and a specific benefit code; and
  in a case where the user identification information, the first type of first printer identification information and the specific benefit code are received from the terminal device and the first type of first printer identification information and the specific benefit code are stored in the memory in association with each other, grant a specific benefit corresponding to the specific benefit code to a user identified by the user identification information,
  in conjunction with the grant of the specific benefit:
    generate a token, in response to a token request from the terminal device;
    output the token to the terminal device; and
    establish a constant connection between the terminal device and the controller based on the token, and the constant connection allowing communication between the terminal device and the controller, such that the controller can send a communication to the terminal device over a firewall without receiving a request from the terminal device; and
  wherein in a case where the user identification information, the first type of first printer identification information and the specific benefit code are received from the terminal device and the first type of first printer identification information and the specific benefit code are not stored in the memory in association with each other, the specific benefit is not granted to the user; and
  the specific benefit causing printing, of the printer, to incur a fee and/or discount, in conjunction with such printing.

11. A method executed by a server that provides a service related to a printer, the server comprising:
a memory configured to store, for each of one or more benefit codes corresponding to one or more benefits of the service, the benefit code and first type of printer identification information identifying a printer in association with each other, and the method comprising:
receiving, from a terminal device, user identification information, first type of first printer identification information and a specific benefit code; and
in a case where the user identification information, the first type of first printer identification information and the specific benefit code are received from the terminal device and the first type of first printer identification information and the specific benefit code are stored in the memory in association with each other, granting a specific benefit corresponding to the specific benefit code to a user identified by the user identification information,
  the granting of the specific benefit being performed in conjunction with:
    generating a token, in response to a token request from the terminal device;
    outputting the token to the terminal device; and
    establishing a constant connection between the terminal device and the server based on the token, and the constant connection allowing communication between the terminal device and the server, such that the server can send a communication to the terminal device over a firewall without receiving a request from the terminal device; and
wherein in a case where the user identification information, the first type of first printer identification information and the specific benefit code are received from the terminal device and the first type of first printer identification information and the specific benefit code are not stored in the memory in association with each other, the specific benefit is not granted to the user; and
the specific benefit causing printing, of the printer, to incur a fee and/or discount, in conjunction with such printing.

* * * * *